United States Patent
Ishikawa et al.

(10) Patent No.: US 6,500,286 B1
(45) Date of Patent: Dec. 31, 2002

(54) METHOD OF MANUFACTURING PNEUMATIC TIRE

(75) Inventors: Takeshi Ishikawa, Kakogawa (JP); Toshio Yamagiwa, Wako (JP)

(73) Assignees: Sumitomo Rubber Industries, Ltd, Hyogo-Ken (JP); Honda Giken Kogyo Kabushiki Kaisha, Tokyo (JP)

( * ) Notice: Subject to any disclaimer, the term of this patent is extended or adjusted under 35 U.S.C. 154(b) by 85 days.

(21) Appl. No.: 09/585,402

(22) Filed: Jun. 2, 2000

(30) Foreign Application Priority Data

Jun. 3, 1999 (JP) .......................................... 11-156430

(51) Int. Cl.$^7$ ......................... B29D 30/00; B60C 19/12
(52) U.S. Cl. ...................................... 156/115; 152/502
(58) Field of Search ............................. 152/502, 503, 152/504, 505, 521; 156/115

(56) References Cited

U.S. PATENT DOCUMENTS

| | | | | |
|---|---|---|---|---|
| 3,930,528 A | * | 1/1976 | Harrington | ................... 152/521 |
| 3,935,893 A | * | 2/1976 | Stang et al. | ................. 152/504 |
| 4,101,494 A | * | 7/1978 | Kent et al. | ................ 152/154.1 |
| 6,264,732 B1 | * | 7/2001 | Tanaka et al. | ........... 106/203.2 |

FOREIGN PATENT DOCUMENTS

JP  A11216781  8/1999

* cited by examiner

*Primary Examiner*—Michael W. Ball
*Assistant Examiner*—Justin Fischer
(74) *Attorney, Agent, or Firm*—Birch, Stewart, Kolasch & Birch, LLP

(57) ABSTRACT

A pneumatic tire and a method of manufacturing the tire are disclosed. The tread portion is provided with a bag-like portion filled with a puncture sealant. The bag-like portion is formed by interposing an anti-adhesive sheet for preventing adjacent tire materials from bonding each other. The sealant includes a substance which dissolves the anti-adhesive sheet, whereby the bag-like portion is filled with the sealant including the anti-adhesive sheet in solution. The sealant may include water and propylene glycol, and in this case, a water soluble plastics film which is, for example, made of polivinyl alcohol obtained by hydrolyzing polyvinyl acetate is preferably used as the anti-adhesive sheet.

2 Claims, 5 Drawing Sheets

METHOD OF MANUFACTURING PNEUMATIC TIRE

The present invention relates to a pneumatic tire and a method of manufacturing the same wherein a puncture sealant is sealed in a space provided along the inside of the tread portion of the tire.

In the laid-open Japanese Patent application JP-A-11-216781, a pneumatic tire is disclosed, wherein, as shown in FIG. 6, a puncture sealant (g) is sealed in a space (j) provided along the inside of the tread portion. The space (j) is formed by interposing an anti-adhesive sheet (c) between an outer rubber (a) and an inner rubber (b). In this tire, depending on the material of the anti-adhesive sheet (c), there is a possibility that the anti-adhesive sheet (c) remaining in the finished tire is torn into shreds through long or heavy use.

On the other hand, it is effectual for sealing puncture holes especially relatively large holes to mix fiber into a sealant.

However, if a sealant including such fiber is used in the above-mentioned tire, there is a possibility that the fiber is caught on the shreds, and as a result, the puncture sealing effect decreases and further the rotational balance of the tire, especially high speed balance deteriorates. Thus, it is difficult to mix fiber into the sealant.

It is therefore, an object of the present invention to provide a pneumatic tire and a method of manufacturing the same, in which such fiber can be mixed into a sealant without the above-mentioned problems, and thus the self-sealing performance is improved.

According to one aspect of the present invention, a pneumatic tire comprises a tread portion provided along the inside thereof with a circumferentially extending bag-like portion, the bag-like portion formed by interposing an anti-adhesive sheet for preventing adjacent materials from bonding each other, the bag-like portion filled with a sealant for self-sealing punctures, the sealant including a substance which dissolves the anti-adhesive sheet, whereby the bag-like portion is filled with the sealant including the anti-adhesive sheet in solution.

Embodiments of the present invention will now be described in detail in conjunction with the accompanying drawings.

Figure 1:
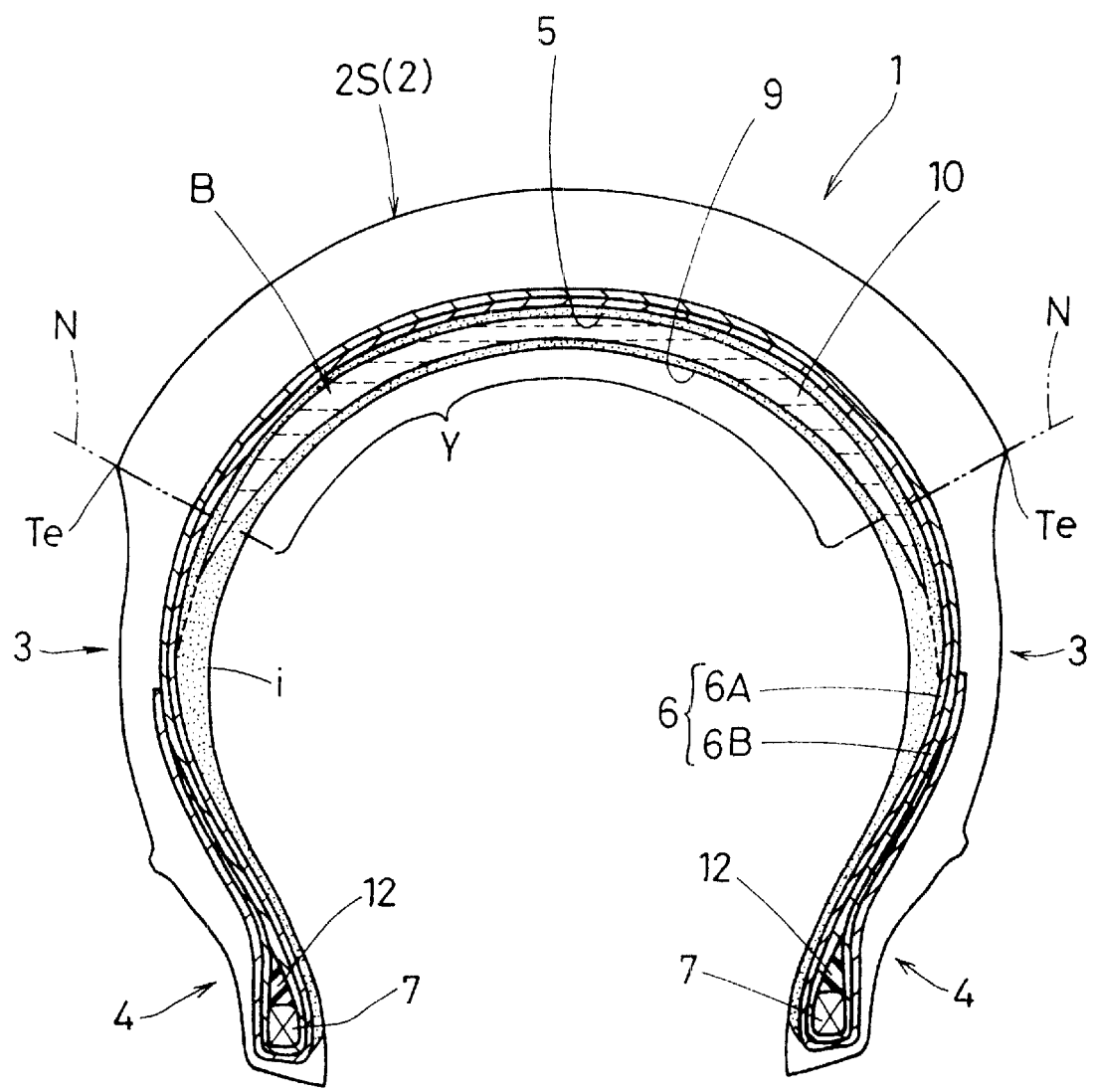
FIG. 1 is a cross sectional view of a pneumatic tire according to the present invention.

In FIG. 1, pneumatic tire 1 according to the present invention is a tubeless tire for motorcycles.

The tire 1 comprises a tread portion 2, a pair of axially spaced bead portions 4 with a bead core 7 therein, a pair of sidewall portions 3 extending between the tread edges Te and the bead portions 4, and a carcass 6 extending between the bead portions 4.

The carcass 6 is composed of at least one ply of cords extending between the bead portions 4 through the tread portion 2 and sidewall portions 3 and turned up around the bead core 7 in each bead portion 4 to form a pair of turnup portions and a main portion therebetween. The carcass 6 may have a radial structure in which the carcass cords are arranged at an angle of from 70 to 90 degrees with respect to the tire circumferential direction or a bias structure in which the carcass cords are arranged at an angle of less than 70 degrees but not less than 35 degrees. In this example, the carcass 6 has a bias structure in which two carcass plies 6A and 6B are arranged crosswise to each other (the cord angles are 42 degrees) and both the carcass plies are turned up around the bead cores from the inside to the outside of the tire to be secured thereto.

Incidentally, each of the bead portions 4 is provided between the turned up portion and the main portion of the carcass with a bead apex 12 made of hard rubber tapering radially outwardly from the bead core 7, and the tread portion 2 may be provided radially outside the carcass 6 with a tread reinforcing belt (not shown).

Further, an inner liner 9 made of a gas-impermeable rubber compound is disposed inside the carcass 6. The inner liner 9 extends continuously from one of the bead portions 4 to the other to cover the inside of the carcass 6. The minimum thickness of the inner liner 9 is set in the range of from 0.5 to 2.5 mm. In this example, the inner liner 9 is made of a rubber compound including natural rubber (NR) and butadiene rubber (BR). Besides this, butyl rubber compounds, e.g. butyl rubber, halogenated butyl rubber and the like are also usable.

Furthermore, the tread portion 2 is provide on the radially outside or the radially inside of the inner liner 9 with a bag-like portion B which is filled with a puncture sealant 10.

The bag-like portion B extends continuously in the tire circumferential direction. And in the axial direction, as shown in FIG. 1, it ranges at least 80% preferably at least 100% of a tread region Y defined between normals N to the tread face 2S drawn at the tread edges Te.

The sealant 10 includes latex as usual and is a viscose liquid at normal temperatures (20 degrees C.) which has a coefficient of viscosity of from 2.0 to 10.0 mPa·s at 20 degrees C.

In this embodiment, the sealant 10 is aqueous and includes water, propylene glycol and fiber. For the fiber, natural fiber and/or synthetic fiber can be used. Preferably, synthetic fiber, e.g. polyester fiber, nylon fiber, glass fiber and the like is used alone or in combination. The average length of the fiber is 1 to 7 mm. The sealant includes the fiber in the range of from 0.5 to 10 weight percent.

The above-mentioned bag-like portion B is formed by using an anti-adhesive sheet S in making the tire.

A method of making the tire according to the present invention comprises at least the following steps:

interposing the anti-adhesive sheet S between the inner liner 9 and a supplementary inner liner 5 which is wider in width than the anti-adhesive sheet but narrower than the inner liner 9 so that only edge portions of the supplementary inner liner 5 come into direct contact with the inner liner 9;

bonding the edge portions to the inner liner 9 to form an unbonded part B where the inner liner 9 and the supplementary inner liner 5 are prevented from bonding together by the presence of the anti-adhesive sheet S;

vulcanizing the raw tire; and injecting the sealant 10 into the unbonded part B of the vulcanized tire to dissolve the anti-adhesive sheet S in the sealant 10.

Preferably, the supplementary inner liner 5 is made of the same material as the inner liner 9. However, it is not always necessary to use the same material. Various materials may be used as far as it can firmly bond to the inner liner 9 and adjacent tire components, if any.

The anti-adhesive sheet must be soluble in the sealant 10 and preferably has a nature not to bond or adhere to the adjoining rubber.

In this embodiment, as the sealant 10 is aqueous, a water soluble plastics film is used. For the water soluble plastics film, a film of polivinyl alcohol (PVA) obtained by hydrolyzing polyvinyl acetate is suitably used. Such polivinyl alcohol film is especially preferable because its physical characteristics, dissolving temperature, dissolving time and the like can be easily adjusted by changing the saponification number and/or the film thickness. Preferably, the thickness thereof is set in the range of from 18 to 40 micrometers.

If the sealant 10 is oily or oil-based, the anti-adhesive sheet S can be made of a material soluble in the oil. As to the base material of the anti-adhesive sheet S, by making a surface treatment, for example using a mold releasing agent, it becomes possible to use such a material that adheres to or bonds with the adjacent rubber.

In case of a material which adheres to or bonds with the adjacent rubber, if the material does not adhere or bond mutually or it is possible to prevent the material from adhering or bonding mutually, by making the anti-adhesive sheet double, the bag-like portion B can be formed between them.

In any case, the point is the sealant 10 includes a substance which dissolves the anti-adhesive sheet S. Thus, for the substance, various chemicals can be used in addition to water and oil.

Next, a method based on the use of an expandable tire building drum 20 will be described.

Figure 2:
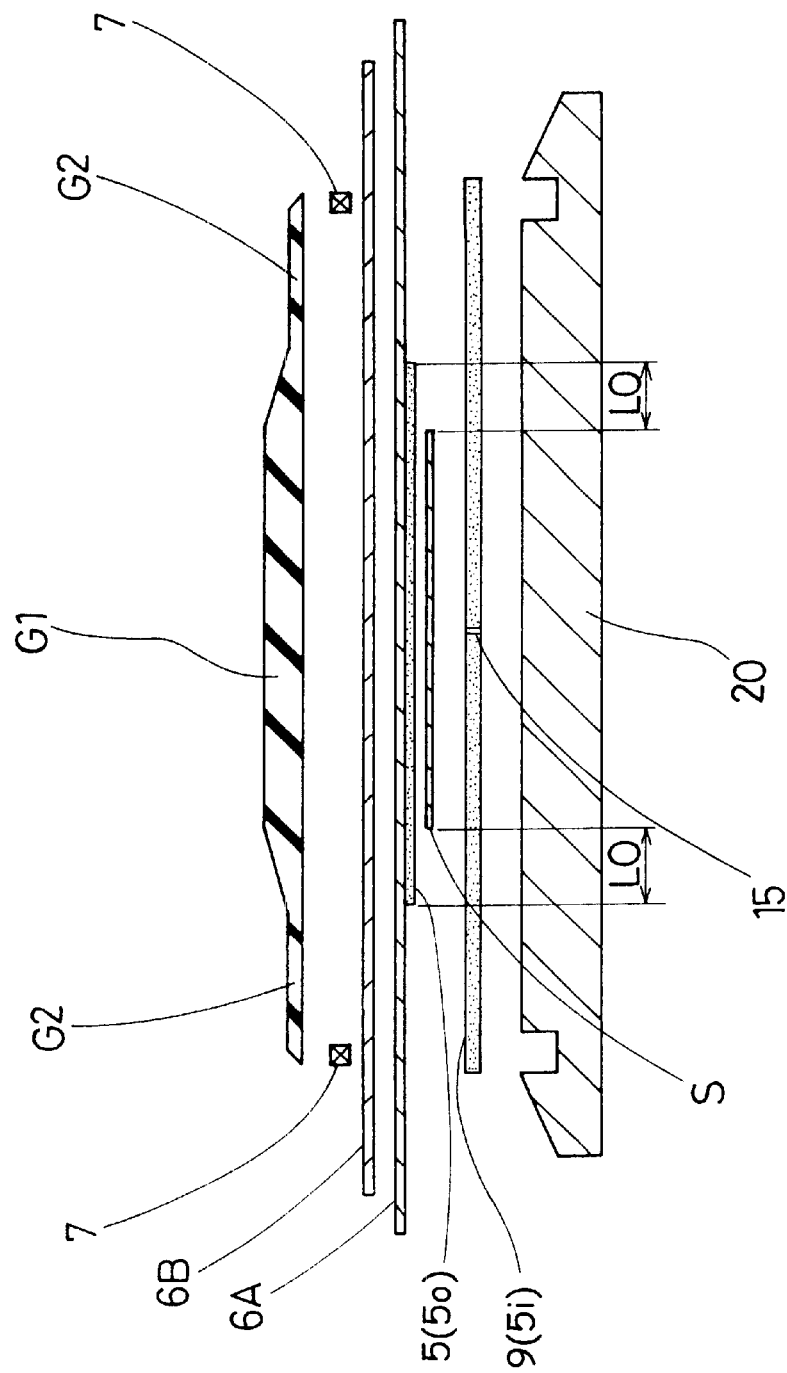
FIG. 2 is a diagram for explaining an arrangement of tire components in making the tire.
Figure 3:
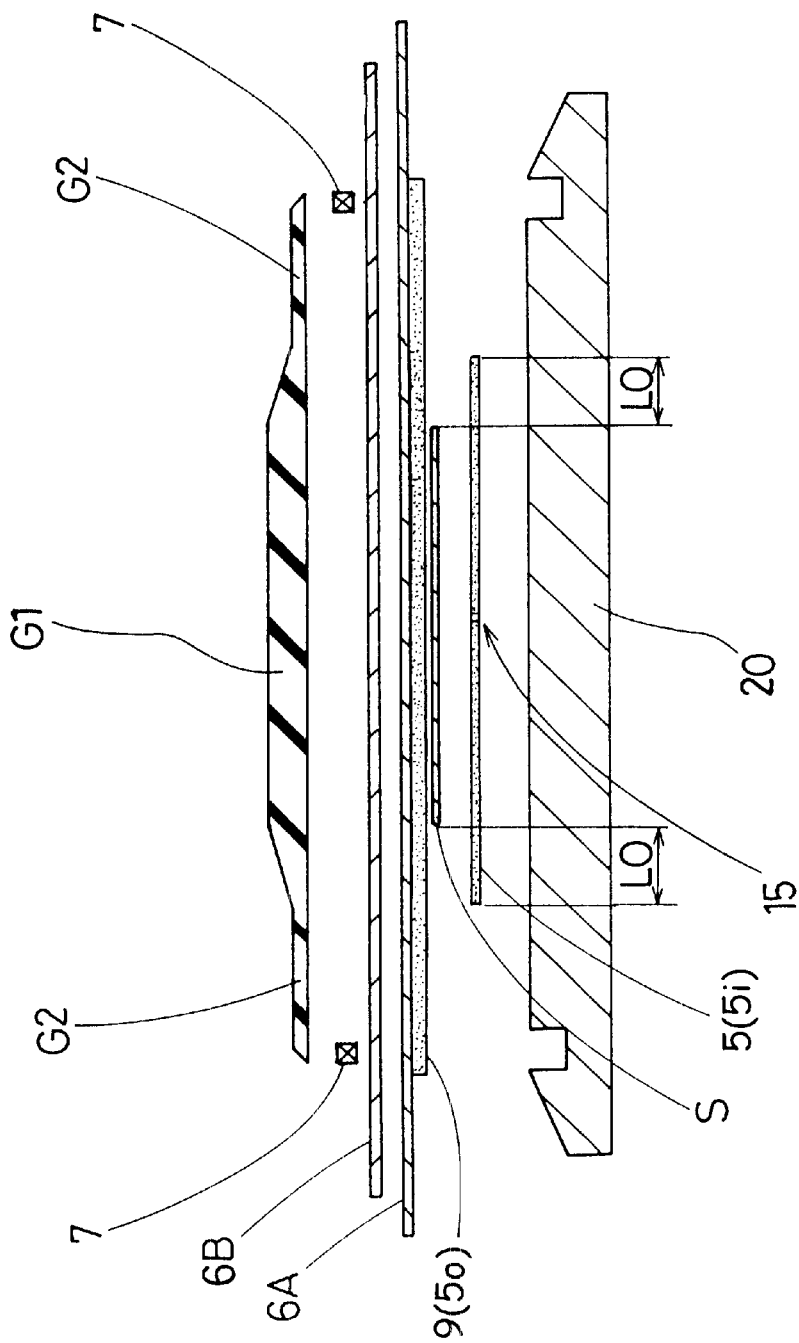
FIG. 3 is a diagram for explaining another arrangement of tire components.

In this method, as shown in FIGS. 2 and 3, the inner liner 9 is wound around a cylindrical surface of the tire building drum 20 in the normal state; the carcass 6 (plies 6A and 6B) is wound radially outside the inner liner 9; the bead cores 7 are set on the outside of the carcass 6; rubber components are applied (if any); the tire building drum 20 is expanded to shape the materials on the cylindrical surface into a toroidal shape, and at the same time, the edges of the carcass ply(plies) are turned up around the bead cores; a tread reinforcing belt is applied (if any); and rubber components are applied. Here, the rubber components include tread rubber G1, sidewall rubber G2, bead apex rubber 12 and the like. Further, the built-up raw tire is put into a mold and vulcanized by applying heat and pressure.

FIG. 2 shows an arrangement of the tire components when the bag-like portion B is radially outside the inner liner 9. FIG. 3 shows an arrangement of the tire components when the bag-like portion B is radially inside the inner liner 9.

In case of FIG. 2, the inner liner 9 is first applied to the cylindrical surface of the tire building drum 20. Then, the anti-adhesive sheet S is applied onto the radially outside of the inner liner 9, and further the supplementary inner liner 5 is applied onto the radially outside of the anti-adhesive sheet S. Further, the carcass 6 is applied.

In case of FIG. 3, the supplementary inner liner 5 is first applied to the cylindrical surface of the tire building drum 20. Then, the anti-adhesive sheet S is applied onto the radially outside of the supplementary inner liner 5, and further the inner liner 9 is applied onto the radially outside of the anti-adhesive sheet S. Further, the carcass 6 is applied.

Further, the following way is also possible: a strip of rubber in which the anti-adhesive sheet S is embedded is first formed by interposing the anti-adhesive sheet S between the narrow inner liner rubber 5 and wide inner liner rubber 9; then the strip is applied to the cylindrical surface of the tire building drum 20; and the carcass 6 is applied thereon.

The innermost liner which functions as the envelope, namely, the inner liner 9 in case of FIG. 2 or the supplementary inner liner 5 in case of FIG. 3 is, before wound around the tire building drum 20, provided with at least one through hole 15 having a diameter of 2 to 8 mm for injecting the sealant 10 into the bag-like portion B.

In the vulcanizing process, the inner liner rubber is fused, and the edges of the supplementary inner liner 5 are bonded to the inner liner 9. In generally, but in case of FIG. 3 in particular, the bonding width L0 or the width of each of the edge portions of the supplementary inner liner 5 which is bonded to the inner liner 9 is at least 4.0 mm but not more than 10.0 mm, preferably in the range of from 5.0 to 7.0 mm to obtain a sufficient bonding strength.

Figure 4:
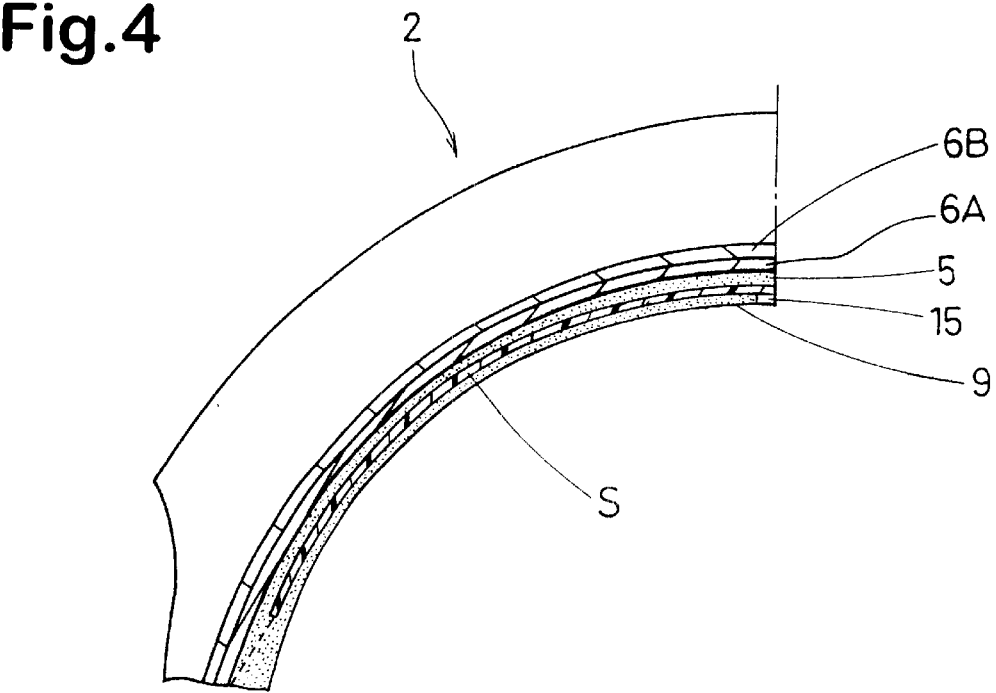
FIG. 4 is a partial cross sectional view showing a state that the tire has been vulcanized but the sealant is not yet injected.
Figure 5:
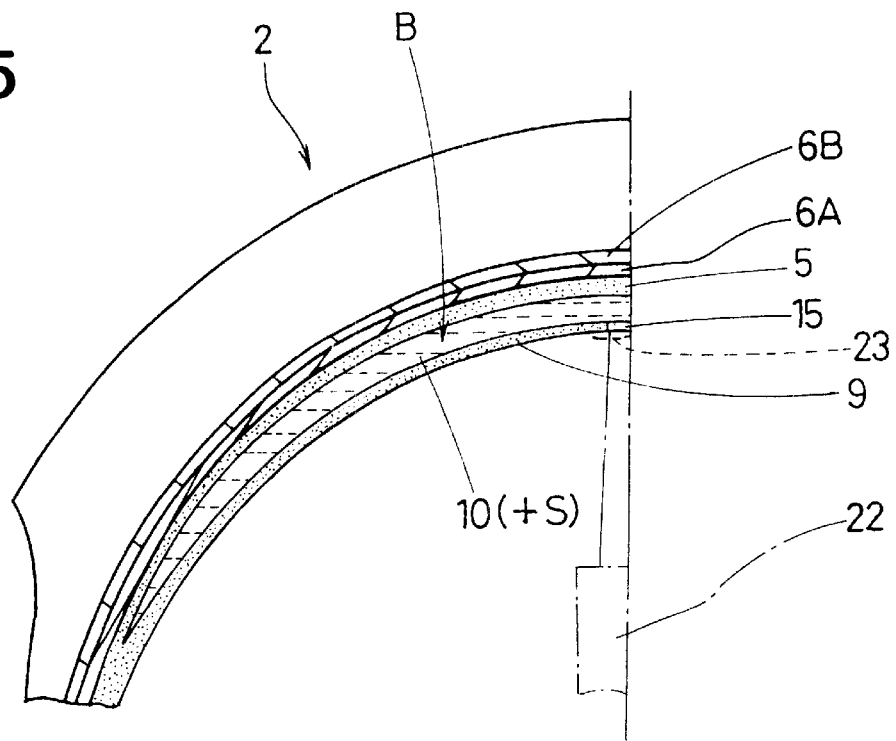
FIG. 5 is a partial cross sectional view showing a state that the sealant has been injected.

After the vulcanization is finished, the tire 1 is took out from the mold. FIG. 4 shows such a state in which the sealant 10 is not injected yet. In this state, the anti-adhesive S still exists in the tread portion 2. Next, using an injector 22, a predetermined volume of the sealant 10 is injected from the injecting hole 15 so as to fill the bag-like portion B therewith. After the sealant 10 is injected, the hole 15 is closed by a rubber patch 23 and the like using an adhesive agent for example. Thereby, a sealant layer 10 of a specific thickness is formed radially inside the tread. As time passed, the anti-adhesive sheet S is dissolved in the sealant 10 and disappears as shown in FIG. 5. Accordingly, in the bag-like portion B, there is only the sealant 10 but which includes the anti-adhesive sheet S in solution.

In this embodiment, during building and vulcanizing the tire, the anti-adhesive sheet S is subjected to a large tension and a high temperature (about 120 to 150 degrees C.). Therefore, the heat resistance of the anti-adhesive sheet S must be at least 150 degrees C., preferably not less than 180 degrees C. Further, the elongation at rupture thereof must be at least 150%, preferably not less than 190% under normal temperatures and normal humidity (20 degrees C., 65%RH). If the elongation at rupture is less than 150%, the anti-adhesive sheet is liable to be torn at the expansion during building and vulcanizing the tire.

As described above, in this embodiment, in order to provide a sufficient distance between the filled sealant 10 and carcass cords, the outer rubber layer 5o is disposed therebetween. However, if there is no fear of a sealant leak and cord erosion, it may be omitted, though the inner rubber layer 5i is necessary as the envelope. In case of FIG. 2 in particular, the supplementary inner liner 5 may be omitted.

On the other hand, the inner liner 9 is used originally for providing the airtightness. However, if the carcass itself or the carcass topping rubber can provide such required airtightness, the inner liner 9 may be omitted in case of FIG. 3 in particular.

Comparison Tests

Motorcycle tires of size 3.00–10 (Embodiment tire and Prior-Art tire) having the same structure shown in FIG. 1 except for the anti-adhesive sheet were made and tested for the puncture self-sealing performance.

In the Prior-Art tire, the anti-adhesive sheet was made of a polyfluoroethylene film. In the Embodiment tire, the anti-adhesive sheet was made of a polivinyl alcohol film ("KURARIA", a tradename of KK KURARAY of Japan) having a thickness of 35 micrometer, a tensile strength of 5.1 kg/sq.mm, an elongation at rupture of 320%, a Young's modulus of 4.6 kg/sq.mm, and a heat resistance of 180 degrees C. The width and length of the anti-adhesive sheet were 140 mm and 760 mm, respectively. The sealant includes 55 parts by weight of water, 40 parts by weight of propylene glycol and 5 parts by weight of fiber.

Puncture self-sealing performance test: About a new tire and a tire run for 3000 km, the tire pressure was measured first, and the tire was punctured by sticking a 1.5 mm dia. nail through the tread portion and pulling it out, and after running for 1 km, the tire pressure was again measured.

In Table 1, the pressure held after running for 1 km under the punctured state is indicated in percentage of the original pressure before punctured.

TABLE 1

Figure 6:
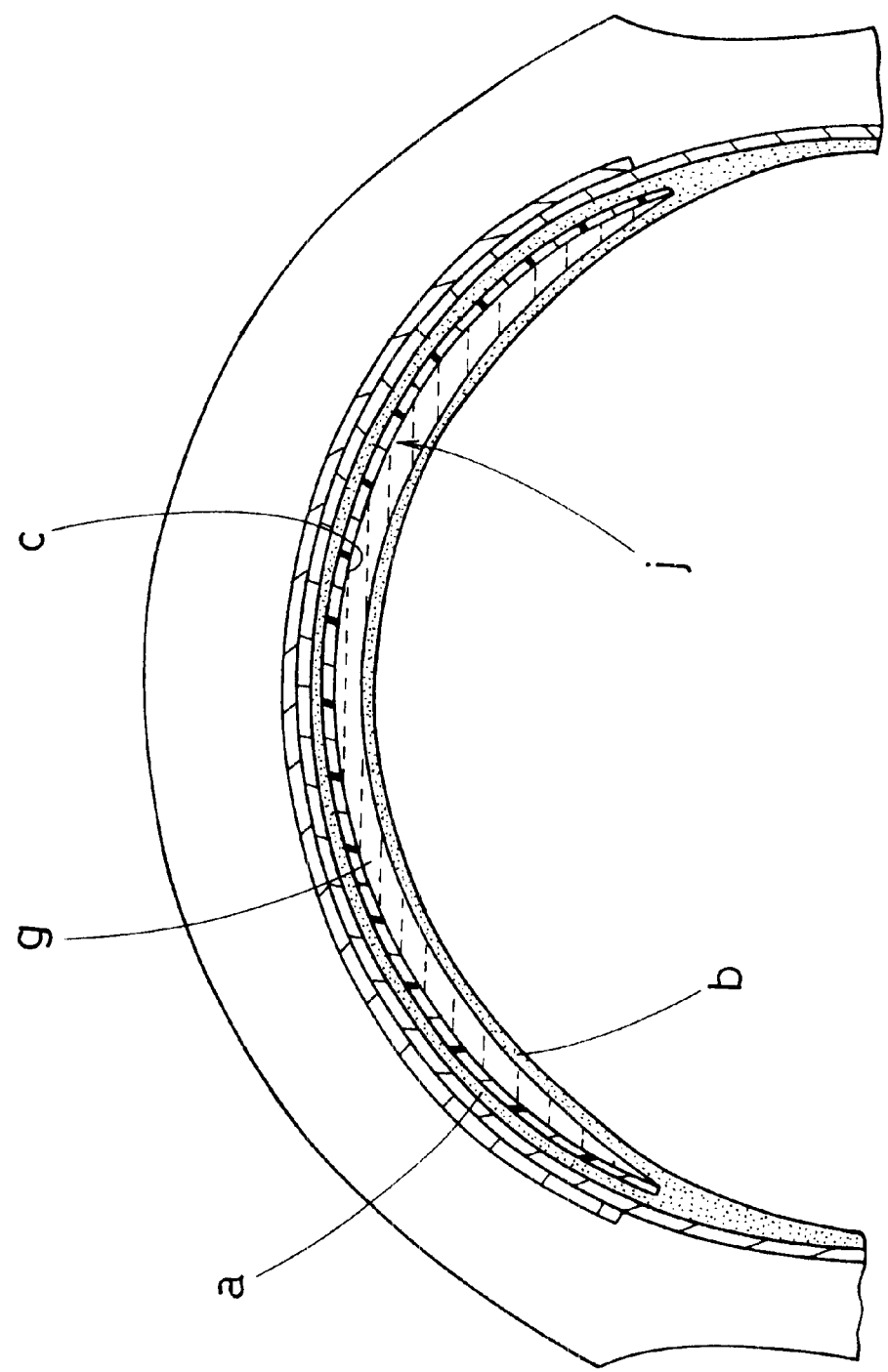
FIG. 6 is a cross sectional view of a tire according to the Prior Art.

| Tire | Embodiment FIG. 1 | Prior Art FIG. 6 |
|---|---|---|
| Inner pressure | | |
| New tire | 99% | 98% |
| 3000 km run tire | 99% | 85% |

From the test, it was confirmed that the self-sealing effect of the tire according to the present invention can be maintained for a long period.

What is claimed is:

1. A method of manufacturing a pneumatic tire,
the pneumatic tire comprising
   a tread portion provided along the inside thereof with a circumferentially extending bag portion, and
   the bag portion being filled with a sealant for self-sealing punctures,
the method comprising
   interposing an anti-adhesive sheet for preventing adjacent tire materials from bonding to each other, thereby forming said bag portion as an unbonded part,
   injecting the sealant into the bag portion so that the sealant contacts with the anti-adhesive sheet, wherein the sealant includes a substance which dissolves the anti-adhesive sheet, and
   dissolving the anti-adhesive sheet, whereby the bag portion is filled with the sealant including the anti-adhesive sheet in solution.

2. The method according to claim 1, wherein
said substance is water or glycol, and
said anti-adhesive sheet is a water soluble plastics film.

* * * * *